UNITED STATES PATENT OFFICE.

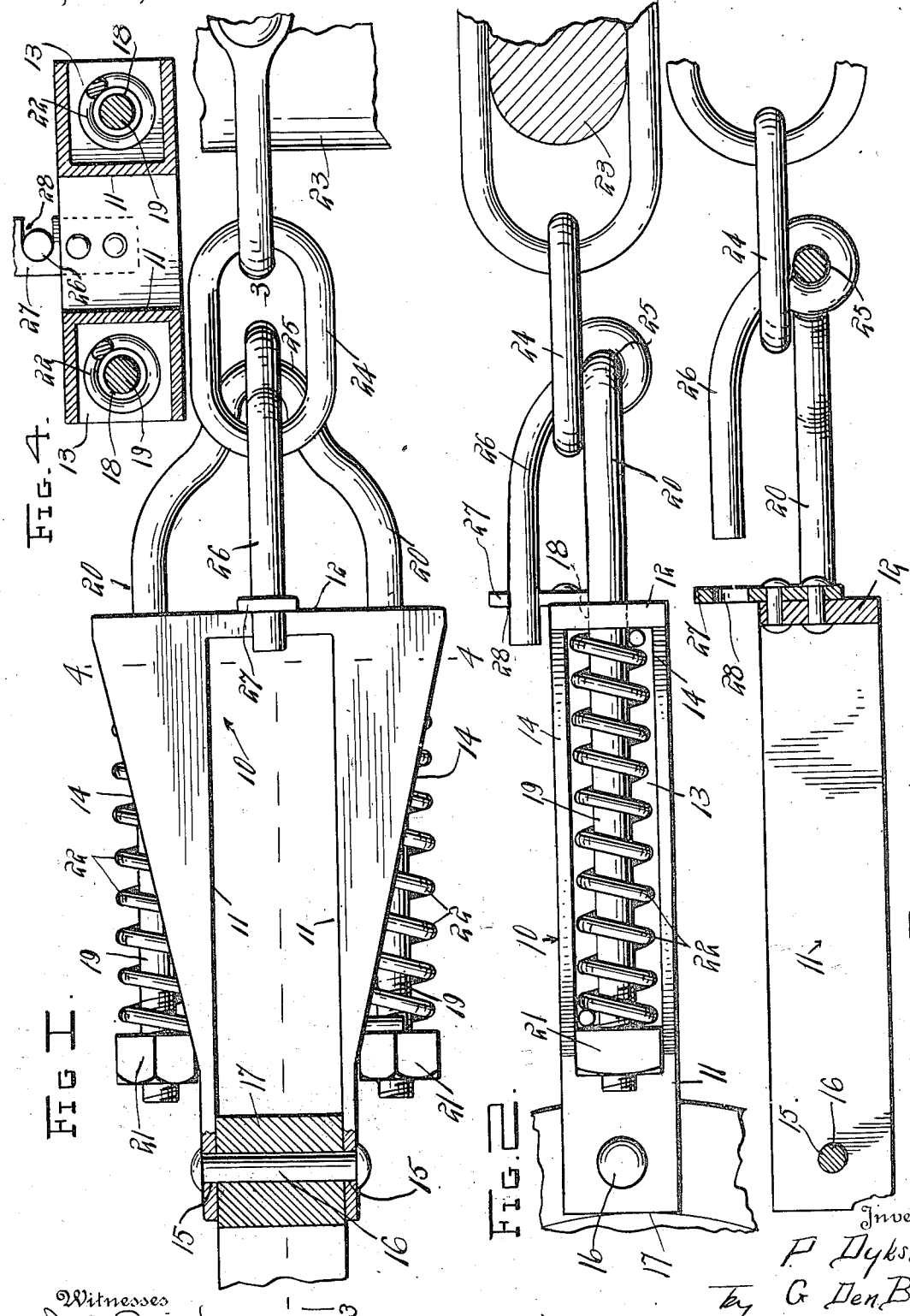

PETER DYKSHORN AND GERRIT DEN BESTEN, OF CORSICA, SOUTH DAKOTA.

SAFETY-CLEVIS.

1,195,191.   Specification of Letters Patent.   Patented Aug. 22, 1916.

Application filed January 25, 1915, Serial No. 4,314. Renewed January 28, 1916. Serial No. 74,858.

*To all whom it may concern:*

Be it known that we, PETER DYKSHORN and GERRIT DEN BESTEN, citizens of the United States, residing at Corsica, in the county of Douglas, State of South Dakota, have invented certain new and useful Improvements in Safety-Clevises; and we do hereby declare the following to be a full, clear, and exact description of the invention, such as will enable others skilled in the art to which it appertains to make and use the same.

This invention relates to safety draft appliances and more particularly to an improved safety clevis of a character to automatically release the draft animals from a plow or other implement should the latter meet an unyielding obstruction, breaking of either the implement or harness or injury to the animals being thus prevented.

Reference will now be had to the accompanying drawing in which like characters designate similar parts throughout the views, and in which:

Figure 1 is a plan view of a clevis embodying our invention, the clevis being shown in connection with a plow beam and double tree, Fig. 2 is a side elevation thereof, Fig. 3 is a longitudinal sectional view taken on the line 3—3 of Fig. 1 with the parts released, and Fig. 4 is a transverse sectional view on the line 4—4 of Fig. 1.

Referring now more particularly to the drawing, the clevis comprises a substantially U-shaped casting 10 including spaced parallel leg portions 11 and a connecting bight portion 12. Formed in each of the legs 11 and extending longitudinally thereof from the bight 12 to a point adjacent the end of said leg is a channel 13 this channel being also of U-shape in cross section and having its side walls tapered from said bight portion as indicated at 14. Bridging the free ends of the legs 11 and engaged through alined openings 15 arranged transversely therein is a pivot bolt 16 by which the clevis may be connected with a plow beam 17 or other implement in the usual manner. Disposed in the bight portion 12 and communicating with the channels 13 are a pair of spaced openings 18 and loosely passed through these openings are the ends 19 of a U-shaped draft bolt 20, said ends being adapted for sliding movement in the channels 13 and having nuts 21 adjustably engaged at the extremities thereof. To hold the draft bolt 20 yieldably retracted within the casting, there are arranged between the nuts 21 and the bight portion 11, and encircling said bolt ends, helical springs 22.

In connecting the clevis with the double-tree 23 there is employed the usual link 24, and pivotally carried by the bight 25 of the bolt 20 is an arm 26, said arm being adapted for releasable engagement through the link in the manner as clearly illustrated. The pivoted end of the arm 26 is directed angularly from its point of connection with the bolt 20 to lie with its free end in overlapping relation to the bight 12 of the casting, there being fixed to the intermediate portion of the latter and extending thereabove a keeper 27 having therein a slotted opening 28 through which said free end of the arm is releasably engaged.

With the clevis connected with the plow as shown in Figs. 1 and 2 should the latter strike an obstruction the draft bolt 20 will compress the springs 22, and if the obstruction be sufficiently unyielding the arm 26 will be withdrawn from the keeper 27, thus releasing the link 24, as shown in Fig. 3 and disconnecting the draft animal whereby injury thereto or to the harness or plow will be prevented.

To adjust the clevis whereby a greater or less degree of strain will be necessary to disengage the arm 26 from the keeper, the bolt 20 is moved rearwardly of the casting and the nuts 21 either tightened or loosened as desired, the bolt being then moved to its normal position with the nuts engaged between the walls of the channels 13 and thus securely held against accidental rotation. It is obvious that by such adjustment of the nuts 21 the arm 26 will be caused to project a greater or less distance within the keeper and thus the degree of pull necessary to sufficiently compress the springs 22 and release the arm, correspondingly varied. It will be further noted that by reason of the slotted opening 28 in the keeper the arm 26 may be readily engaged therein when it is desired to again connect the device with the double tree, such connection being thus effected without altering the adjustment of the parts.

What is claimed is:—

A safety clevis comprising a substantially U-shaped casting including parallel legs and a connecting bight portion, said legs being each formed with a longitudinal channel registering with an opening formed in said bight portion, a U-shaped clevis bolt engaged through said openings and slidable in said channels, nuts adjustably engaging the ends of said bolt, compressible springs encircling said bolt between the nuts and said bight portion, an arm pivotally connected to said bolt, a link releasably engaged with said arm for connection with a draft element, and a keeper fixed to said bight portion for engagement with the free end of said arm.

In testimony whereof, we affix our signatures in the presence of two witnesses.

PETER DYKSHORN.
GERRIT DEN BESTEN.

Witnesses:
P. VANDER WERP,
GEO. A. WESTERHEIN.